Sept. 11, 1928. J. HAHN Re. 17,079
BLOOM SHEARS
Original Filed Aug. 16, 1924 2 Sheets-Sheet 1
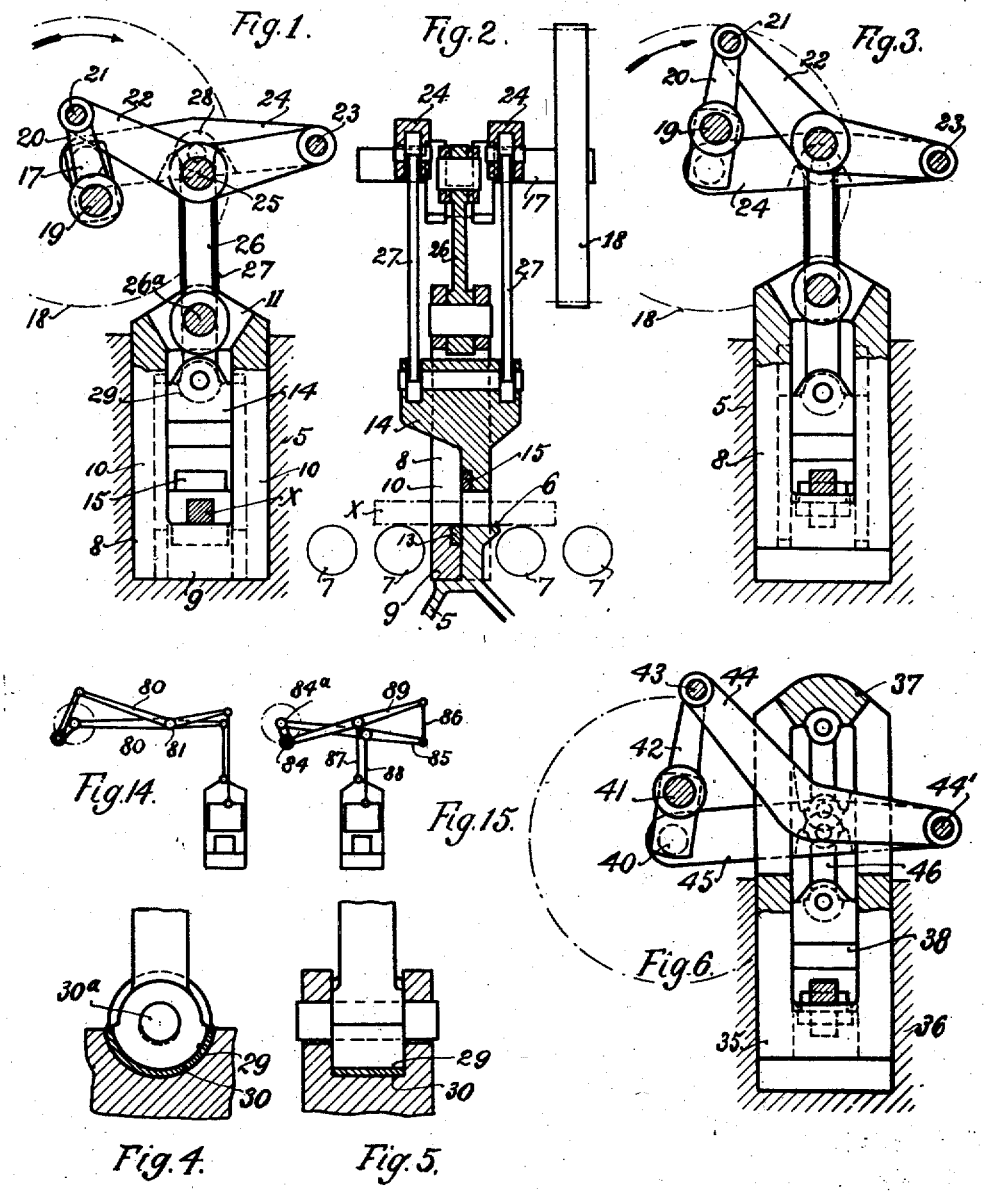
INVENTOR
Johann Hahn
by W. G. Doolittle
his attorney Sept. 11, 1928. J. HAHN Re. 17,079
BLOOM SHEARS
2 Sheets-Sheet 2
Original Filed Aug. 16, 1924
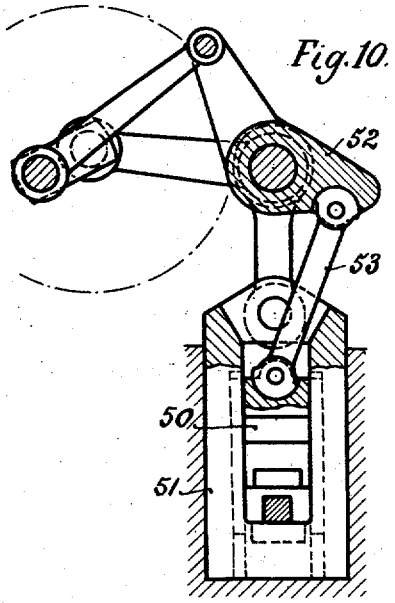
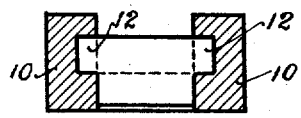
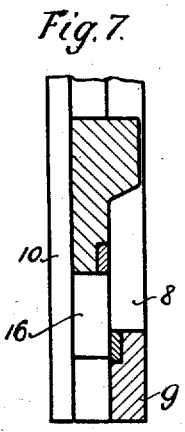
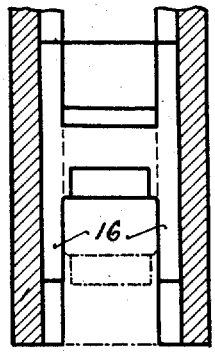
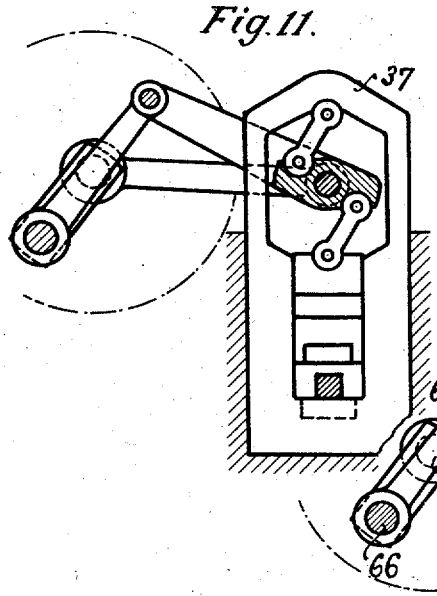
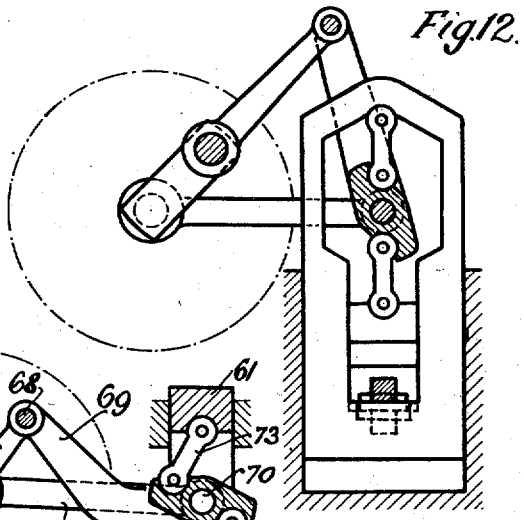
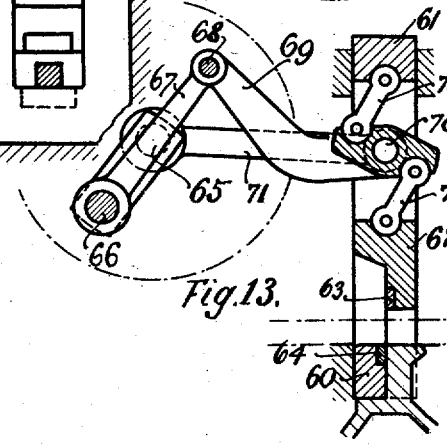
Fig.13.
INVENTOR
Johann Hahn
by W. S. Dodge
his attorney Reissued Sept. 11, 1928.

Re. 17,079

UNITED STATES PATENT OFFICE.

JOHANN HAHN, OF CLEVELAND, OHIO.

BLOOM SHEARS.

Original No. 1,588,635, dated May 19, 1925, Serial No. 732,489, filed August 16, 1924. Application for reissue filed September 2, 1926. Serial No. 133,287.

This invention is for shearing devices, and relates particularly to a bloom shear.

In the usual shear for blooms now in use, the bloom or bar rests on the lower knife, and the upper knife moves down with respect thereto to effect the shearing of the bloom. In this shearing operation, the two knives of the shear overlap, or should overlap, a slight distance at the completion of the cutting stroke. The part of the bloom in contact with the top knife, that is, the portion overhanging the lower knife, must be free to move down as the upper knife moves down. It is this shifting of the two sections of the bloom with respect to each other and under the pressure of the knives that severs the bloom. This had led to the use of a downwardly yieldable or depression table in connection with this type of shear. Such tables are not generally satisfactory, and frequently cause trouble.

In order to eliminate the shear depression tables, it has been proposed to utilize a shear wherein the upper knife moves down into firm contact with the bloom, after which the bottom knife rises to shear the bloom, its upward stroke being completed when the knives slightly overlap. After the shearing, the bottom knife moves down and then the top knife rises.

This movement is easily obtained where each knife is moved by a separate hydraulic cylinder mechanism, and can also be obtained by a suitable system of levers. German patent to Bruno Quast No. 332,527 illustrates one such system of levers, while an improved lever movement for operating shears is shown in my German Patent No. 393,878.

In my German patent above noted, I have shown a single lever for effecting the movement of the upper and lower knives.

According to the present invention, I propose to provide a new mechanism for operating the knives, wherein a system of two levers interposed between an operating shaft and the knives is utilized, and has for its object to provide a more efficient and practical method of operating the knives.

A further important object is to provide in a shear of this type, improved means for transmitting compressive strains between moving parts; and to provide a shear wherein motion from the levers to the knives may be transmitted through two compression members instead of by a compression and a tension member.

A further important object is to provide means in the knife carriers for counteracting spreading strains of forces, instead of transmitting such forces to the shear housing, as has heretofore been customary.

These and other objects and advantages are attained by my invention, which is illustrated in the accompanying drawings, but it will be understood that such drawings are to be considered as illustrative of the invention, and that various changes and modifications may be made in the constructions shown within the spirit of the invention.

In the drawings:

Fig. 1 illustrates, somewhat diagrammatically, a shear having a novel arrangement of levers for operating the knives, showing the knives open, the figure representing a vertical section through the shear;

Fig. 2 is another view, partly in section and partly in elevation of the shear shown in Fig. 1;

Fig. 3 corresponds to Fig. 1, but shows the position of the parts at the end of the shearing stroke;

Figs. 4 and 5 are detail views of the knuckle joints used in the shear;

Fig. 6 is a partial section similar to Fig. 1, but of a modified form wherein compression members are used for moving both knives;

Figs. 7, 8 and 9 are detail views of the knife carriers;

Fig. 10 shows a shear of the general type illustrated in my German Patent No. 393,878, but having improved joints for the compression rods;

Figs. 11 and 12 are open and closed views, respectively, of an improved form of single lever shear, incorporating the improvements of the structure shown in Fig. 6;

Fig. 13 is a view generally similar to Fig. 2 of a modification, but showing the eccentric shaft parallel with the knives instead of at right angles thereto;

Figs. 14 and 15 are diagrammatic showings of modified arrangements of operating levers.

In Figs. 1 to 5 inclusive, 5 designates a suitable shear housing. A bloom support is indicated at 6, and 7 indicates suitable conveying means or rollers, as is generally provided.

The bottom knife carrier 8 preferably comprises a cast steel frame, having a cross member 9 at the bottom, spaced apart sides 10, and a bifurcated or open top 11. The construction of the preferred form of the carrier is shown in Figs. 7, 8 and 9, in which the sides 10 are shown as having grooves 12 therein. The knife is designated 13.

Received in the lower knife carrier is the upper knife carrier 14, which is guided in grooves 12, and on the lower end of which is the knife 15. Projecting down each side of the knife are extensions 16 which serve to provide the upper knife carrying member with a greater bearing surface in the lower carrier.

Entirely above the shear housing, where it is free of dirt and scale, and readily accessible, is the operating mechanism for the shear. This includes a shaft 17 which may be suitably driven by a large wheel 18.

The shaft has a crank or eccentric 19 thereon to which is connected a link 20. The outer end of link 20 pivotally connects at 21 with a lever 22, which is preferably slightly angular. The outer end of this lever pivotally connects at 23 with the outer end of a second lever, or rather, the outer ends of parallel levers 24, whose inner ends bear on the shaft 17. Two paralel levers 24 are used in place of a single lever only for convenience, and good mechanical design, but their action is that of a single lever.

Pivoted to lever 22 between its ends at 25 is a link 26 whose lower end pivotally connects at 26[a] with the top of the bottom knife carrier.

Levers 24 are operatively connected with the upper knife carrier by parallel rods 27 having a knuckle joint connection with the levers at 28, and having a similar connection with the upper knife carrier at 29. Wear strips 30 may be provided with the upper knife carrier at 29. Wear strips 30 may be provided in these bearings, as indicated in Figs. 4 and 5. Pins 30[a], used in these joints, are designed to positively connect the ends of the links with the parts to which they attach, so that the rods may function to lift the carrier as well as to depress it. As their load in lifting is negligible, the pins need not be heavy.

The operation of the shear may now be followed. The bloom X is run between the knives while they are wide open and the parts in the position shown in Fig. 1. Wheel 18 is rotated to turn crank or eccentric 19 in a clockwise direction, that is, the direction of the arrow in Fig. 1. At this time, it will be noted, the lower knife carrier 8 rests on the bottom of the shear housing. As the eccentric or crank rotates, point 21 rises, rocking lever 22 on pivot 25, and point 23 moves down, levers 24 swinging in an arc about shaft 17 as the center. As point 23 moves down, rods 27 are forced down, lowering the upper knife carrier 14 until the knife 15 presses the bloom X.

Due to the resistance of the bloom, knife 15 is checked, so that point 23 may not move further down. This causes link 20 to lift lever 22, swinging it in an arc about point 23. This forces the lower knife carrier 8 upwardly, shearing the bloom.

The cutting will be effected always, irrespective of the thickness of the bloom, just as the eccentric approaches dead center, the knives overlapping just a sufficient amount when the full dead center is reached.

As the crank or eccentric rotates further, the lower knife carrier is moved down until it touches the bottom of the shear housing, whereupon point 25 becomes stationary, and the point 23 begins to rise until the upper knife carrier is again in the fully open position of Fig. 1.

The arrangement of levers is such that they do their work most effectively, and that the shearing strains are always almost vertical, the levers never moving to a position where there is any considerable side thrust on links 26 or 27.

By the use of kunckle joints at 28 and 29 for rods 27, a large bearing surface for the ends of the rods is obtained in the most compact and accessible form. In my German patent above referred to, I have shown wrist pins, in a shear of this general type, but, due to the tremendous pressures, running into the hundreds of tons, which these pins must stand, they are necessarily of such large diameter as to considerably complicate the construction.

The knuckle joint connection has a further advantage, in that the socket, such for instance as at 29, may be kept full of lubricant.

By having the upper knife carrier guided in the lower one, the tendency of the knives to spread when making a cut is counteracted. By making them interfit in this manner, instead of following the usual method of guiding each knife in the shear housing, the construction is greatly cheapened and strengthened, inasmuch as the shear housing is made of cast iron, while the knife carriers must be made of steel.

In Fig. 6, I have shown the lower knife carrier 35 in the shear housing 36 as having an upward extension 37 that projects above the operating levers. The upper knife carrier 38 slides in the lower carrier, as hereinbefore described.

The operating mechanism is substantially the same. The drive shaft is designated 40, and 41 is the crank or eccentric on which is link 42. Link 42 has its outer end pivoted at 43 to curved lever 44 which passes through the lower knife carrier well above the upper knife carrier. The other end of lever 44 is pivoted at 44′ to the outer ends of levers 45, one of which extends through each side of the lower knife carrier, and each of which bears on the drive shaft.

With this arrangement, compression rods 46 may be used for transmitting motion downwardly from levers 45 to the upper knife, and an upwardly extending compression rod bearing in the top 37 of the lower knife frame is used for transmitting motion from lever 44 thereto.

The shear is shown in closed position, that is, with the parts shown in the position they assume immediately after shearing when the knives are overlapping.

The advantage of this construction is that all shearing forces are transmitted through compression members to the respective knife carriers instead of partly by compression members and partly by tension members, as in Fig. 1.

In Fig. 10, I have shown a shear operated by a system of single levers, as in my German Patent No. 303,878. The present drawing represents an improvement thereover, in that the upper knife carrier 50 slides in and is guided and retained by the lower carrier 51. Motion is transmitted, furthermore, to the upper knife carrier from a lever 52 by a compression rod 53 having a knuckle joint at each end, as shown. As before pointed out, this eliminates the use of the large pins shown in said patent, and thereby reduces angular displacements to a minimum.

In Figs. 11 and 12, I have shown the same system of operating levers as that shown in Fig. 10, used with the lower knife carrier of Fig. 6, and have used corresponding reference numerals. Fig. 11 shows the shear open and Fig. 12 shows it closed. This arrangement permits, as in Fig. 6, of the use of compression elements entirely in effecting the shearing operation.

In Fig. 13, which represents a section through a modified form, 60 designates the lower knife carrier having an upwardly extending portion 61, similar to the lower knife carrier of Figs. 6 and 11. Slidable therein in the manner hereinbefore described, is the upper knife carrier 62. The upper and lower knives are designated 63 and 64, respectively.

The operating mechanism is generally similar to that shown in Figs. 11 and 12, but the drive shaft 65 is parallel with the plane of the knives instead of being transverse thereto, as in all the other figures. This shaft has the eccentric or crank 66 that operates link 67 pivoted at 68 to one end of lever 69, whose other end extends into the lower knife carrier above the upper knife carrier and at right angles to the plane of movement thereof. This lever is pivotally supported at 70 on links 71 bearing on the shaft 65. Compression bars 72 and 73 of the knuckle joint type serve to transmit motion from lever 69 to the upper and lower knife carriers, respectively.

When the crank 66 is rotated in clockwise direction, link 67 rocks lever 69, forcing bar 72 down to move the upper knife carrier down, the lower knife carrier remaining stationary by reason of the floating pivot 70. When the lower knife presses the bloom, lever 69 will transmit pressure to rods 73 to raise the lower knife carrier, and thereby shear the bloom. This provides an extremely simple and efficient arrangement.

In Fig. 14, which is diagrammatic, I have shown a modification of the two-lever operating mechanism of Fig. 1, wherein the levers 80 are connected between their ends at 81. The operating rods connect with the free ends of these levers. The method of operation is similar, however, with that described in connection with Fig. 1.

In Fig. 15, which is also diagrammatic, there is a further modification of the two-lever arrangement, wherein one of the levers 89 is directly connected to the crank or eccentric 84, while the other end of the lever 89 connects with one end of a second lever 85 through link 86. The lever 85 has its other end bearing on the crank shaft 84ª, and motion is transmitted to the knives through the vertical rods 87 and 88 connecting with levers 89 and 85, respectively, between the ends thereof.

It will be readily seen that various other changes and modifications may be made in the construction of the shear within the contemplation of the invention.

What I claim is:

1. In a bloom shear, a shear housing, upper and lower knife carriers movable in the housing, a knife carried by each of said carriers, and interfitting parts on said carriers slidably engaging each other whereby one carrier may be slidably engaged on the other and each movable with respect to the other, said interfitting parts serving to hold the carriers against spreading and preventing strains being transmitted to the housing, and means for moving each carrier with respect to the other.

2. A bloom shear including a shear housing, a lower knife carrier, an upper knife carrier, a drive shaft having an eccentric thereon, a link engaging the eccentric, a lever having one end pivoted to the link and having its other end pivotally connected with a second lever movable in an arc about the shaft, means engaging the first lever between its ends for transmitting motion to the lower knife carrier, and means engaging the second lever between its ends for transmitting motion to the upper knife carrier.

3. A bloom shear including a lower knife carrier, an upper knife carrier, a lever system for effecting movement of the carriers, a rod for transmitting motion from said system to the lower knife carrier, and a rod having a knuckle bearing at each end thereof for transmitting motion from the lever system to the upper knife carrier.

4. A bloom shear including a lower knife carrier, an upper knife carrier, an extension on the lower knife carrier projecting above the upper knife carrier, a lever system for moving the carriers, means for operating the lever system, a downwardly extending compression rod engaging a lever in the system and engaging the upper knife carrier for effecting movement thereof, and a second compression rod engaging a lever in the system and extending upwardly for engagement with the lower knife carrier, whereby shearing forces may be transmitted to both carriers entirely through compression rods.

5. A bloom shear including a shear housing, a lower knife carrying member having a knife portion and having an upwardly extending portion thereon having a clearance opening therein, an upper knife carrier coacting with the lower one having its lower end below the top of the upper one, said upper carrier also having a knife portion for coaction with the knife portion of the lower carrier, and means for moving the top carrier down into engagement with a bloom and for moving the bottom carrier up to shear the bloom, said means including a lever mechanism which extends into the clearance opening of the lower carrier above the upper carrier, and a compression rod extending from the lever mechanism upwardly into engagement with the upper portion of the lower carrier for applying the upward movement thereto, and a compression member engaging the lever mechanism extending down into engagement with the top of the upper knife carrier.

6. A bloom shear including a shear housing, a lower knife carrying member having a knife portion and having an upwardly extending portion thereon having a clearance opening therein, an upper knife carrier coacting with the lower one and having its lower end below the top of the upper one, said upper carrier also having a knife portion for coaction with the knife portion of the lower carrier, and means for moving the top carrier down into engagement with a bloom and for moving the bottom carrier up to shear the bloom, said means including a lever mechanism which extends into the clearance opening of the lower carrier above the upper carrier, and a compression rod extending from the lever mechanism upwardly into engagement with the upper portion of the lower carrier for applying the upward movement thereto, and a compression member engaging the lever mechanism extending down into engagement with the top of the upper knife carrier, each compression member having a knuckle joint engagement at each end thereof with the parts with which it engages.

7. The combination with a bloom shear having upper and lower knife carriers, of means for reciprocating each carrier relatively to the other, said means including a pair of levers, connecting rods, and a drive shaft above the knives, each lever of the pair being operatively connected with a knife carrier, and an eccentric means on the shaft connected with one of the levers, said levers being in planes parallel to the plane of movement of the knife edges.

8. In a bloom shear, the combination with a housing, of a plurality of knife carriers, cooperating means on the carriers for counteracting spreading strains to which they are subjected in use, whereby the spreading strains produced during the shearing action react against each other to confine the said strains to the carriers and prevent them being transmitted to the housing, and means for operating the carriers.

9. In a bloom shear, the combination with a housing, of an upper movable knife carrier and a lower movable knife carrier, a knife carried by each of the said carirers, said carriers disposed in the housing and arranged in contact with each other and movable relatively to each other, cooperating means on the carriers for counteracting spreading strains to which they are subjected in use, whereby the reactions of the spreading strains produced during the shearing operation equalize each other, thereby confining the strains to the carriers and preventing their transmission to the housing, and means for moving the carriers.

10. In a bloom shear, the combination with a shear housing, of a lower knife carrier and an upper knife carrier, one slidable on the other, said carriers disposed in the shear housing and having interfitting tongue and groove connections between the carriers to prevent spreading of the carriers during the sliding movement thereof, and means for moving each carrier with respect to the other, said means including two independent levers each operatively engaged with a carrier.

11. In a bloom shear, the combination with a housing, a lower knife carrier, an upper knife carrier, a lever system for moving the carriers, means for operating the lever system, a downwardly extending compression rod engaging a lever in the system and engaging the upper knife carrier for effecting a movement thereof, and a second compression rod engaging a lever in the system and extending upwardly for engagement with the lower knife carrier, whereby shearing forces may be transmitted to both carriers entirely through the compression rods.

12. In a bloom shear, the combination with a housing, of an upper knife carrier, a lower knife carrier, a lever, a compression rod having a knuckle bearing connected with the upper knife carrier and the lever, a compression rod having a knuckle bearing connected with the lower knife carrier and the lever, and means for moving the carriers, said means connected with the compression rods.

13. In a bloom shear, the combination with a housing, of an upper knife carrier, a lower knife carrier, a lever, a compression rod having a knuckle bearing at each end thereof, connected with the upper knife carrier and the lever, and a compression rod having a knuckle bearing at each end thereof connected with the lower knife carrier and the lever.

14. In a bloom shear, the combination with a housing, of an upper movable knife carrier having a compression rod operatively connected therewith, a lower movable knife carrier having a compression rod operatively connected therewith, a knife carried by each of the said carriers, and a lever system for moving both of the said carriers, said carriers disposed in the housing and provided with cooperating means for maintaining them in sliding contact with each other and preventing spreading thereof, whereby the reactions of the spreading strains produced during the shearing operation equalize each other and thereby confine the strains to the carriers and prevent their transmission to the housing.

15. In a bloom shear, the combination with a housing, of a downwardly movable automatically adjustable shearing knife, an upwardly movable automatically adjustable shearing knife, carriers for the respective knives, actuating mechanism for the shearing knives disposed above the knives and including lever and link connecting members for transmitting the automatic movement and shearing forces, cooperating means on the knife carriers whereby said transmitted forces are self-contained within the said mechanism and independent of the shear housing, said housing acting to guide the shearing and actuating mechanism.

In testimony whereof I hereunto affix my signature.

JOHANN HAHN.